Patented Aug. 8, 1939

2,168,947

UNITED STATES PATENT OFFICE

2,168,947

DYESTUFFS OF THE ANTHRAQUINONE SERIES

Werner Zerweck and Ernst Heinrich, Frankfort-on-the-Main-Fechenheim, Germany, assignors to General Aniline Works, Inc., New York, N. Y., a corporation of Delaware No Drawing. Application January 27, 1938, Serial No. 187,156. In Germany February 4, 1937

4 Claims. (Cl. 260—377)

Our present invention relates to dyestuffs of the anthraquinone series more particularly of the general formula:

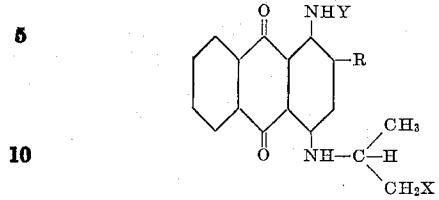

wherein Y stands for a member of the group consisting of hydrogen and alkyl, X for a member of the group consisting of hydrogen and methyl and R represents a member of the group consisting of hydrogen, an alkoxy-, carboxyamide- and sulfonic acid group.

The new dyestuffs may be obtained for instance by acting with isopropylamine or isobutylamine on an 1-amino-4-halogenoanthraquinone-2-sulfonic acid or nuclear substitution products thereof and splitting off in a given case the sulfonic acid group standing in the 2-position or substituting it by an other monovalent group.

By a suitable selection of further substituents in the anthraquinone nucleus the properties of the dyestuffs formed can be varied in a far-reaching manner. By introducing water solubilizing groups into the anthraquinone nucleus valuable acid wool dyestuffs are obtained surpassing the known analogous dyestuffs by better fastness properties. For instance the present dyestuffs containing in the 4-position of the anthraquinone nucleus an isopropylamino- or a secondary butyl-amino-group and in the 2-position a sulfonic acid group are superior to the isomeric dyestuff containing a n-butylamino-group, owing to a substantially increased fastness to light.

Those of the present dyestuffs which do not contain water solubilizing groups may be used advantageously for dyeing and printing cellulose esters and ethers and they likewise surpass the known analogous dyestuffs owing to better fastness properties. For instance 1-amino-4-isopropylamino-anthraquinone and 1-amino-4-secondary butylamino-anthraquinone may be mentioned, which are superior to 1-amino-4-methyl-amino-anthraquinone owing to an essentially better fastness to light.

In order to further illustrate our invention the following examples are given, the parts being by weight and all temperatures in degrees centigrade, but we wish it, however, to be understood that our invention is not limited to the examples given nor to the exact conditions stated therein.

Example 1

A mixture of 40 parts of the sodium salt of 1-amino-4-bromoanthraquinone-2-sulfonic acid, 15 parts of isopropylamine, 10 parts of sodium carbonate, 4 parts of cuprous chloride and about 2000 parts of water is heated for about 8 hours at 80 to 90°. From the blue reaction solution the 1-amino-4-isopropylaminoanthraquinone-2-sulfonic acid formed is isolated by adding sodium chloride. The dyestuff dyes wool clear blue shades fast to light and exhibits a good levelling power. It dissolves in concentrated sulfuric acid with a yellowish brown color turning to greenish blue after the addition of paraformaldehyde. The new dyestuff corresponds with the formula:

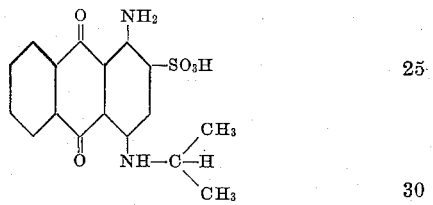

When starting from the 1-amino-4-bromo-5-acetylaminoanthraquinone-2-sulfonic acid the formed dyestuff dyes wool more greenish shades.

When splitting off from the above dyestuff the sulfonic acid group for instance by heating it with glucose in an alkaline medium the 1-amino-4-isopropylaminoanthraquinone of the formula:

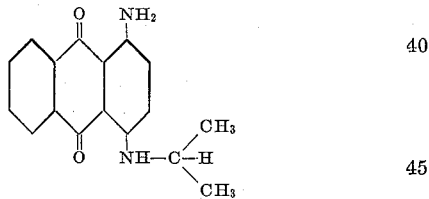

is obtained, which dyes acetate silk pure and fast bluish violet shades. When heating in a closed vessel a mixture of 1-amino-4-isopropylaminoanthraquinone-2-sulfonic acid and of an aqueous potassium cyanide solution the 1-amino-2-cyanogeno-4-isopropylaminoanthraquinone is formed which can be saponified yielding the 1-amino-4-isoproplyamino-anthraquinone-2-carboxyamide of the formula:

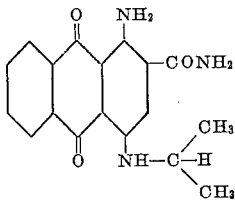

This compound dyes acetate silk pure greenish blue shades of a good levelling power and fastness to light.

When boiling for some hours a solution of 1-amino-4-isopropylaminoanthraquinone-2-sulfonic acid, dissolved in ethylalcohol of 50% strength, the sulfonic acid group is replaced by the ethoxy group. The formed 1-amino-2-ethoxy-4-isopropylaminoanthraquinone of the formula:

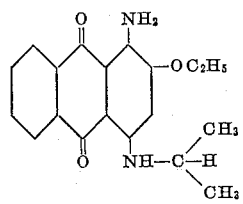

dissolves in concentrated sulfuric acid with a brownish red solution, turning to reddish violet after the addition of paraformaldehyde. It dyes acetate silk strong reddish violet fast shades. When introducing in the same manner into the 2-position of the anthraquinone nucleus radicles of other mono- or poly-valent alcohols the formed products dye acetate silk likewise reddish violet shades.

Example 2

40 parts of the sodium salt of 1-amino-4-bromo-anthraquinone-2-sulfonic acid are condensed with 18 parts of secondary butylamine according to the details described in Example 1. In this manner the 1-amino-4-secondary butylamino-anthraquinone-2-sulfonic acid of the formula:

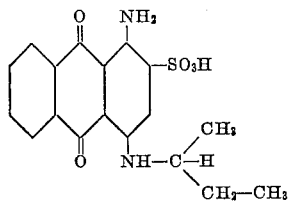

is formed, which dyes wool fast reddish blue shades. When splitting off the sulfonic acid group for instance by treatment with glucose in an alkaline medium the 1-amino-4-secondary butylaminoanthraquinone of the formula:

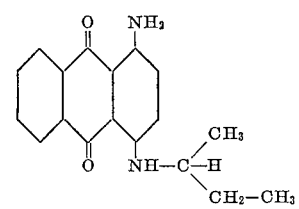

is formed which dyes acetate silk somewhat reddish blue-violet shades fast to light.

Example 3

A mixture of 36 parts of 1-benzoylamino-4-chloro-anthraquinone, 125 parts of an aqueous solution of isopropylamine of 50% strength, about 375 parts of dioxan and 3 parts of cuprous acetate is heated for about 10 hours in a closed vessel at about 150°. When cool the separated 1-benzoylamino-4-isopropylamino-anthraquinone is isolated. From glacial acetic acid it crystallizes as violet needles of about 241° melting point. It dissolves in concentrated sulfuric acid with a reddish brown color turning to olive-green after the addition of paraformaldehyde.

By means of sulfuric acid of about 90% strength it is saponified while forming the 1-amino-4-isopropylaminoanthraquinone which crystallizes from monochlorobenzene as bronze colored crystals of about 180° melting point. It dissolves in concentrated sulfuric acid with a brownish red color turning to blue after the addition of paraformaldehyde, and dyes acetate silk as said above pure bluish violet shades of a good fastness particularly to light.

The above mentioned 1-benzoylamino-4-chloroanthraquinone may be replaced by compounds containing instead of chlorine an other replaceable group such as the nitro or methoxy group.

Example 4

A mixture of 62 parts of the potassium salt of anthraquinone-1-sulfonic acid, 28 parts of the sodium salt of 3-nitrobenzene-1-sulfonic acid, 160 parts of an aqueous solution of isopropylamine of 50% strength and about 3000 parts of water is heated in a closed vessel for about 6 hours at about 180 to 190°. The formed 1-isopropylaminoanthraquinone is isolated. It crystallizes from glacial acetic acid as red needles of about 187° melting point. By treatment with bromine in the presence of glacial acetic acid the 1-isopropylamino-4-bromoanthraquinone is formed, which crystallizes from dilute alcohol as red needles of about 120° melting point. The decomposition thereof by means of benzenesulfamide in the presence of nitro-benzene and cuprous acetate yields the 1-isopropylamino-4-phenylsulfonylaminoanthraquinone and by saponifying the latter compound by means of sulfuric acid the 1-amino-4-isopropylaminoanthraquinone.

When nitrating the 1-isopropylaminoanthraquinone by means of nitric acid of 33° Bé. the 1-isopropylamino-4-nitroanthraquinone is formed, which yields by reduction with sodiumsulfide the 1-amino-4-isopropylaminoanthraquinone.

Example 5

A mixture of 24 parts of 1,4-diamino-leucoanthraquinone, 24 parts of 1,4-dihydroxyanthraquinone, 50 parts of a solution of isopropylamine in isobutyl alcohol of 25% strength and about 350 parts of isobutylalcohol is heated in a closed vessel for about 60 hours at 90 to 100°. Then the leuco-compound of the 1-amino-4-isopropylaminoanthraquinone which partly exists in the reaction mixture is oxidized by blowing in air into the mixture after the addition of 3 parts of cuprous acetate. By evaporating the isobutylalcoholic solution in vacuo the formed 1-amino-4-isopropylaminoanthraquinone separates in a crystalline form.

Example 6

A mixture of 400 parts of methanol, 150 parts of water, 24 parts of 1,4-diamino-leucoanthraquinone, 30 parts of an aqueous solution of monomethylamine of 25% strength and 33 parts of an aqueous solution of isopropylamine of 50% strength is heated to boiling for some hours. The formed yellowish brown solution of 1-methylamino-4-isopropylamino-leucoanthraquinone is oxidised by blowing in air after the addition of 1 part of cuprous acetate. When cool the formed 1 - methylamino-4-isopropylaminoanthraquinone of the formula:

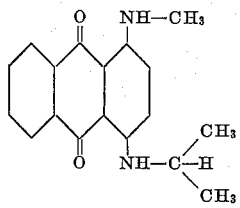

is isolated. It crystallizes from monochlorobenzene as bronze colored crystals melting at 216 to 217°. It dissolves in concentrated sulfuric acid with a yellowish brown color turning to blue after the addition of paraformaldehyde and dyes acetate silk fast reddish blue shades.

By replacing in the above example the amount of methylamine by a corresponding quantity of aminomethanol the 1-oxethylamino-4-ispropylamino-anthraquinone is formed which dyes acetate silk likewise reddish blue shades.

We claim:

1. Dyestuffs of the antraquinone series of the general formula:

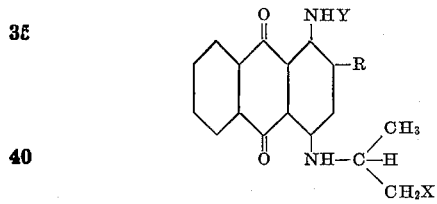

wherein Y stands for a member of the group consisting of hydrogen and alkyl, X for a member of the group consisting of hydrogen and methyl and R represents a member of the group consisting of hydrogen, an alkoxy-, carboxyamide- and sulfonic acid group.

2. A dyestuff of the anthraquinone series of the formula:

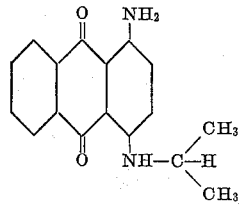

which dyestuff dissolves in concentrated sulfuric acid with a brownish red color turning to blue after the addition of paraformaldehyde and dyes acetate silk pure bluish violet shades of a good fastness particularly to light.

3. A dyestuff of the anthraquinone series of the formula:

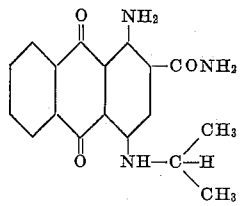

which dyestuff dyes acetate silk pure greenish shades of a good levelling power and fastness to light.

4. A dyestuff of the anthraquinone series of the formula:

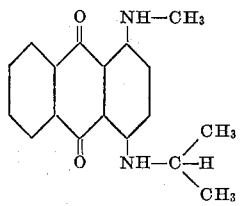

which dyestuff crystallizes from monochlorobenzene as bronze colored crystals melting at 216 to 217°, dissolves in concentrated sulfuric acid with a yellowish brown color turning to blue after the addition of paraformaldehyde and dyes acetate silk fast reddish blue shades.

WERNER ZERWECK.
ERNST HEINRICH.